United States Patent [19]
Glew et al.

[11] Patent Number: 5,956,753
[45] Date of Patent: Sep. 21, 1999

[54] METHOD AND APPARATUS FOR HANDLING SPECULATIVE MEMORY ACCESS OPERATIONS

[75] Inventors: Andrew F. Glew, Hillsboro; Haitham Akkary, Portland, both of Oreg.

[73] Assignee: Intel Corporation, Santa Clara, Calif.

[21] Appl. No.: 08/914,399

[22] Filed: Aug. 19, 1997

Related U.S. Application Data

[63] Continuation of application No. 08/176,364, Dec. 30, 1993, abandoned.

[51] Int. Cl.$^6$ ..................................................... G06F 12/00
[52] U.S. Cl. ............................................ 711/205; 395/381
[58] Field of Search .................................... 711/205, 202, 711/204, 213, 137, 144, 145; 395/383, 381

[56] References Cited

U.S. PATENT DOCUMENTS

| | | | |
|---|---|---|---|
| 5,226,126 | 7/1993 | McFarland et al. | 395/375 |
| 5,434,987 | 7/1995 | Abramson et al. | 395/375 |
| 5,442,757 | 8/1995 | McFarland et al. | 395/375 |
| 5,442,766 | 8/1995 | Chu et al. | 395/450 |
| 5,471,598 | 11/1995 | Quattromani et al. | 711/122 |
| 5,539,911 | 7/1996 | Nguyen et al. | 395/800 |

OTHER PUBLICATIONS

Mike Johnson, *Superscalar Microprocessor Design*, Prentice Hall, Inc., 1991, pp. 1–288.
Popescu, et al., "The Metaflow Architecture," IEEE Micro, pp. 10–13 and 63–73, Jun. 1991.

*Primary Examiner*—David L. Robertson
*Attorney, Agent, or Firm*—Blakely, Sokoloff, Taylor & Zafman

[57] ABSTRACT

The method and apparatus are employed within a microprocessor capable of generating speculative memory accesses instructions. Certain instructions access memory locations containing speculatable information while others access memory locations containing non-speculatable information. Memory-type values indicating the speculatability or non-speculatability of memory locations are stored within a translation lookaside buffer. Prior to executing a speculative memory instruction, the microprocessor accesses the translation lookaside buffer to determine whether the memory location targeted by a memory instruction contains speculatable or non-speculatable information. Then, depending upon the memory-type value found in the translation lookaside buffer, execution of the speculative memory instruction is performed immediately or is deferred until the instruction is no longer speculative. In protected mode, the translation lookaside buffer caches linear addresses, physical addresses and corresponding memory-type values. In real mode, the translation lookaside buffer caches the memory-type values along with physical addresses, but does not cache linear addresses. The translation lookaside buffer is operated in both protected mode and real mode to access the cached memory-type information.

31 Claims, 5 Drawing Sheets

METHOD AND APPARATUS FOR HANDLING SPECULATIVE MEMORY ACCESS OPERATIONS

This is a continuation of application Ser. No. 08/176,364, filed Dec. 30, 1993, now abandoned.

BACKGROUND OF THE INVENTION

1. Field of the Invention

The invention generally relates to computer systems. More specifically, the invention relates to the structure and use of a translation lookaside buffer within a computer system capable of the speculative processing of memory accesses.

2. Description of Related Art

A translation lookaside buffer ("TLB") is commonly employed within a microprocessor for facilitating the translation of linear addresses to physical addresses for prompt memory access. FIG. 1 illustrates a portion of a conventional microprocessor architecture employing a TLB 10. TLB 10 is connected through a central processing unit ("CPU") bus 12 to an instruction fetch and issue unit 13, an address generation unit ("AGU") 14, a page miss handler ("PMH") 16, a data cache unit 17 ("DCU") and a system bus driver 18. Bus driver 18 is also connected through a system bus 20 to a main memory 22 and an input/output unit 21.

Numerous other functional elements of the conventional microprocessor architecture are, for clarity and brevity, not illustrated within FIG. 1. Rather, FIG. 1 merely illustrates a limited number of functional components sufficient to describe the operation of a TLB. The functional units illustrated in FIG. 1 may be interconnected by separate data busses, where appropriate. The TLB includes a separate data TLB ("DTLB") (not shown) and a separate instruction TLB ("ITLB") (not shown).

In use, instruction fetch and issue unit 13 generates instructions or commands for use in accessing data stored within main memory 22. The memory access instructions may specify that the data is to be loaded from main memory 22 or that data is to be stored within main memory 22. The instructions are received along the CPU bus 12 by AGU 14 which generates an address identifying the location of the data to be loaded or stored. When operating in "real" mode, AGU 14 generates the actual physical address of the data to be accessed within main memory 22. The physical address is then latched by DCU 17 which attempts to satisfy the memory instruction from internal cache lines. If the data subject to the memory access instruction is not contained within the internal cache lines of DCU 17, the instruction is merely routed through the system bus driver 18 to main memory 22 for directly accessing the physical address either to store data to the physical address or to load data from the physical address.

When operating in "protected" mode, AGU 14 generates a "linear" address which must first be converted to a physical address before main memory 22 may be accessed. PMH 16 performs a translation of the linear address received from AGU 14 to a physical address. Typically, PMH 16 performs a page table walk which includes a sequence of operations controlled by a state machine within PMH 16 to convert the linear address to a physical address. A wide variety of techniques have been developed for performing a page table walk to generate a physical address and such techniques will not be described in detail herein.

Most page table walk techniques are rather time consuming. To expedite the translation of linear addresses to physical addresses, TLB 10 provides a table relating selected linear addresses to physical addresses. More specifically, TLB 10 operates as a cache by storing a linear address and its corresponding physical address for several of the most recently accessed memory locations. Prior to performing a page table walk using PMH 16, the linear address generated by AGU 14 is transmitted to TLB 10 which determines whether internal registers of TLB 10 already contain a translation of the linear address to a corresponding physical address. If the address to be translated is contained within TLB 10, the corresponding physical address is merely output from TLB 10 for immediate processing by any functional unit requiring the physical address, such as DCU 17. If the translation for the linear address is not currently maintained within the TLB 10, then PMH 16 performs the above-described page table walk for generating the physical address. Typically, TLB 10 stores physical addresses for corresponding linear addresses for all of the most recently accessed pages of memory. If an address translation is not found within TLB 10, a page "miss" is said to have occurred and PMH 16 performs the address translation to remedy the page miss—hence the name "page miss handler."

FIG. 2 illustrates one entry 23 within TLB 10. As can be seen, the entry includes a linear address 24, a corresponding physical address 26 and one or more status bits 28. The status bits 28 may indicate, for example, whether the entry contains a valid translation.

In the foregoing description, it was assumed that any memory access generated by the microprocessor can be immediately executed once the physical address for the memory access has been determined. However, with certain microprocessor architecture's and for certain applications, a memory access must be deferred pending the resolution of one or more conditions. In such systems, once the physical address is determined, the memory access instruction cannot, or should not, be immediately executed. Such may occur, for example, in a microprocessor which is capable of generating "out-of-order" or "speculative" memory access operations. In an out-of-order microprocessor, memory access operations may be issued by instruction unit 13 in an order other than that which is defined by a software program. Out-of-order issuing of memory access instructions may be employed to enhance overall processor efficiency by exploiting any parallel processing capabilities of the microprocessor. When memory access operations are issued out-of-order, it may be necessary to hold one or more of the operations in abeyance pending execution of other, later issued, operations. For example, the execution of a memory access may require deferral until the resolution of a branch condition, such as an "If" statement.

In a microprocessor architecture capable of speculative processing, further efficiency is gained by performing a branch prediction upon the occurrence of any unresolved branch condition. Branch prediction allows commands subsequent to the branch to be speculatively processed pending resolution of the branch condition. In other words, for each branch condition the microprocessor predicts which branch is to be taken, then executes subsequent instructions speculatively. The ability to execute commands speculatively further exploits any parallel processing capability of a system by allowing at least some commands which depend upon a branch condition to be performed prior to actual resolution of the branch condition. General aspects of out-of-order and speculative processing are described in "Super Scalar Microprocessor Design" by Mike Johnson, Prentice-Hall, Inc. 1991.

As can be appreciated, numerous limitations exist as to which commands or instructions can be performed out-oforder and which can be performed speculatively. One possible limitation to the execution of instructions and commands is that actual memory accesses to main memory may require deferral until the execution of prior instructions or until the resolution of prior branch conditions. For example, it may be undesirable to perform a load from main memory based on a speculative load operation if the speculative load accesses memory mapped I/O.

Thus, in certain computer processors, such as out-of-order processors and speculative processors, it is desirable to store information identifying whether a memory access operation can be performed immediately or must be deferred pending the resolution of some condition, such as the resolution of any speculative antecedent conditions. It is also desirable to implement such a capability using one or more of the memory access functional units illustrated in FIG. 1. It is to this end that the present invention is directed.

BRIEF SUMMARY OF THE INVENTION

The invention relates to a memory system for use in a microprocessor capable of speculative processing wherein speculatable memory accesses are processed immediately and non-speculatable accesses are deferred. The invention provides an improvement to such a system wherein a value identifying whether a memory location subject to a memory access is speculatable or non-speculatable is stored within a TLB. The TLB is accessed both in real mode and in protected mode to allow for access to the information identifying whether the memory location subject to the memory access is speculatable or non-speculatable.

In one embodiment, a memory system is provided which includes a memory, such as a main memory, for storing information, such as data or instructions. The information is stored at a physical address within the memory and is of a first or a second type. The first type of information is information which can be subject to an immediate memory access, i.e., information which is "speculatable". Information of the second type is information for which a memory access must be deferred, i.e., information which is "non-speculatable".

The system also includes a processor for generating memory access commands specifying addresses of information to be retrieved from the memory with the memory access commands being immediately executable for accessing information of the first type and being deferred for accessing information of the second type. A TLB is provided for storing a linear address and a corresponding physical address for selected information. The TLB also stores a value indicating whether the information is of the first or the second type. A TLB access unit is provided for accessing the TLB for determining whether the information subject to a proposed memory access is of the first type or the second type.

A memory access unit is also included for accessing information from the memory corresponding to the address generated by the processor with the access being executed immediately for information of the first type and deferred for information on the second type.

The value indicative of whether the memory access is immediately executable or must be deferred may be a "memory-type" value which corresponds to pages of physical addresses and identifies whether the physical addresses are speculatable or a non-speculatable memory locations. All information which is speculatable is stored only in physical address having a speculatable memory-type designation. All information which is non-speculatable is stored in physical addresses having a non-speculatable memory-type designation. The choice of which memory locations contain speculatable or non-speculatable information may be specified, for example, by a computer programmer on a program-by-program basis.

Where the information to be accessed includes data, the TLB includes a DTLB which stores physical address, linear addresses, and memory-types for selected pages of data. Where the information includes instructions, the TLB includes an ITLB which stores physical addresses, linear addresses and memory-types for selected instructions.

To allow the memory-type to be accessed from the TLB regardless of whether the system is operating in real mode or in protected mode, the TLB access unit provides a protected mode access unit and a real mode access unit. The protected mode access unit accesses the TLB with a linear address for determining the corresponding physical address and memory-type. The real mode access unit accesses the TLB with a physical address and determines the memory-type.

Hence, unlike conventional systems, wherein a TLB is accessed only in protected mode to provide address translation, the TLB of the memory system of the invention are also accessed in real mode. Tables identifying the memory-type for memory address locations are stored within memory-type range registers ("MTRR's") which may be maintained within a page miss harder (PMH). The MTRR's are provided such that, if the physical address or linear address to be accessed is not stored within the TLB, then the memory-type can be determined by the PMH. If the system is operating in protected mode, the memory-type is determined by the PMH during a page table walk. If the system is operating in real mode, no page table walk is needed, and the MTRR's are accessed merely to retrieve the memory-type. The MTRR's may alternatively be maintained in external memory and accessed by the PMH during a page table walk.

By storing a value indicating whether a data or an instruction address corresponds to a speculatable address within a TLB and by operating the TLB means both in real mode and in protected mode, a determination of whether a memory access operation can be performed immediately or must be deferred is efficiently accomplished within a microprocessor issuing speculative memory access instructions. Hence, the objectives set forth above within the Background of the Invention section are conveniently met. Other features, objects and advantages of the invention will be understood from the Detailed Description of the invention set forth below.

DETAILED DESCRIPTION OF PREFERRED EMBODIMENTS

Referring to FIGS. 3–6, preferred embodiments of the invention will now be described.

Figure 1:
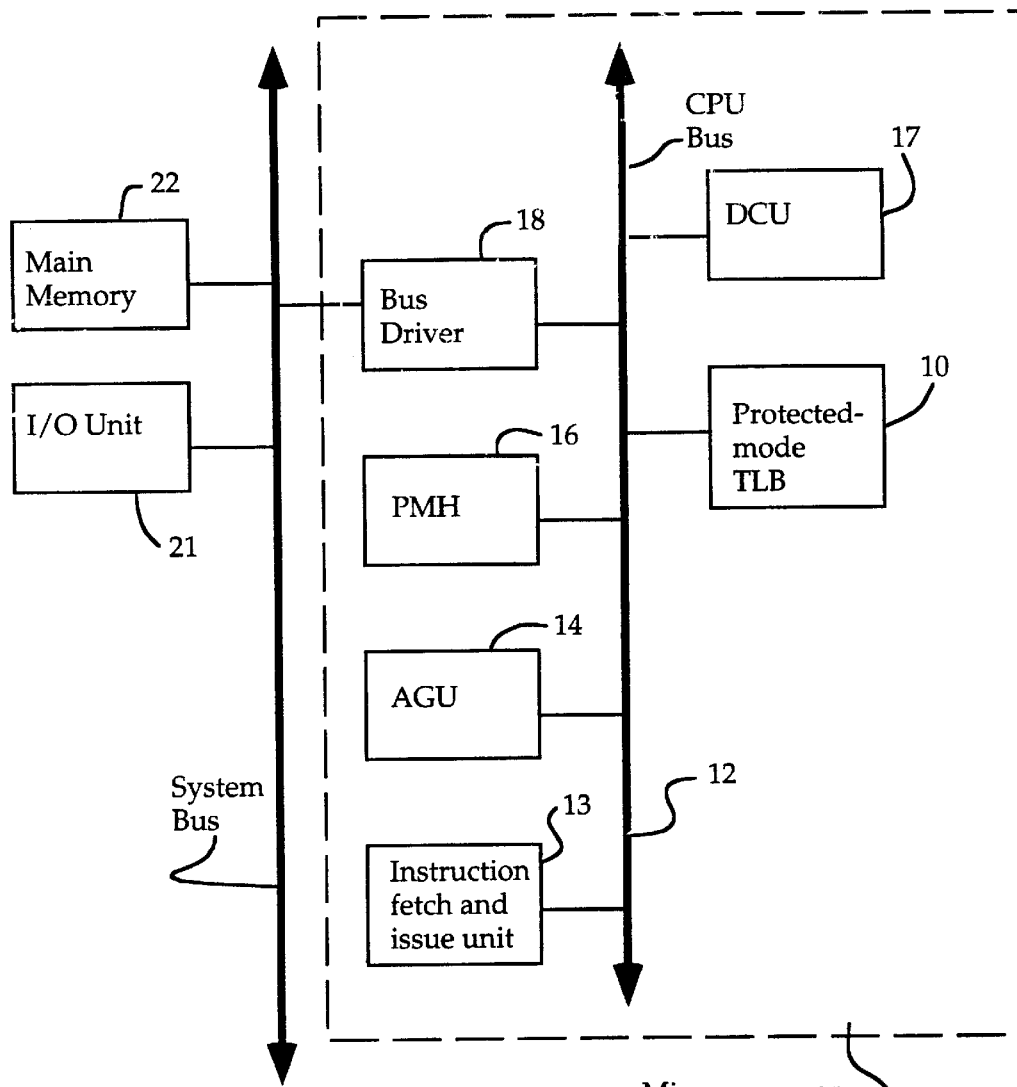
FIG. 1 is a block diagram illustrating portions of a prior art microprocessor, particularly illustrating a TLB which operates in protected mode only.
Figure 2:
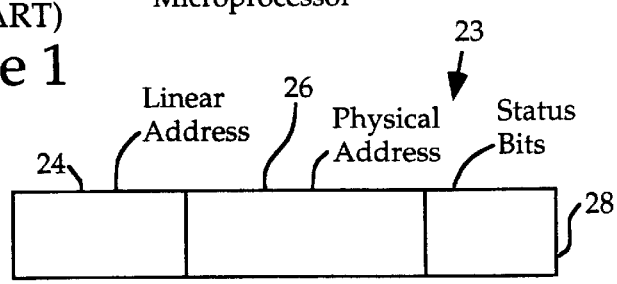
FIG. 2 is a block diagram illustrating an entry of the TLB of FIG. 1 which caches a linear address and a corresponding physical address.
Figure 3:
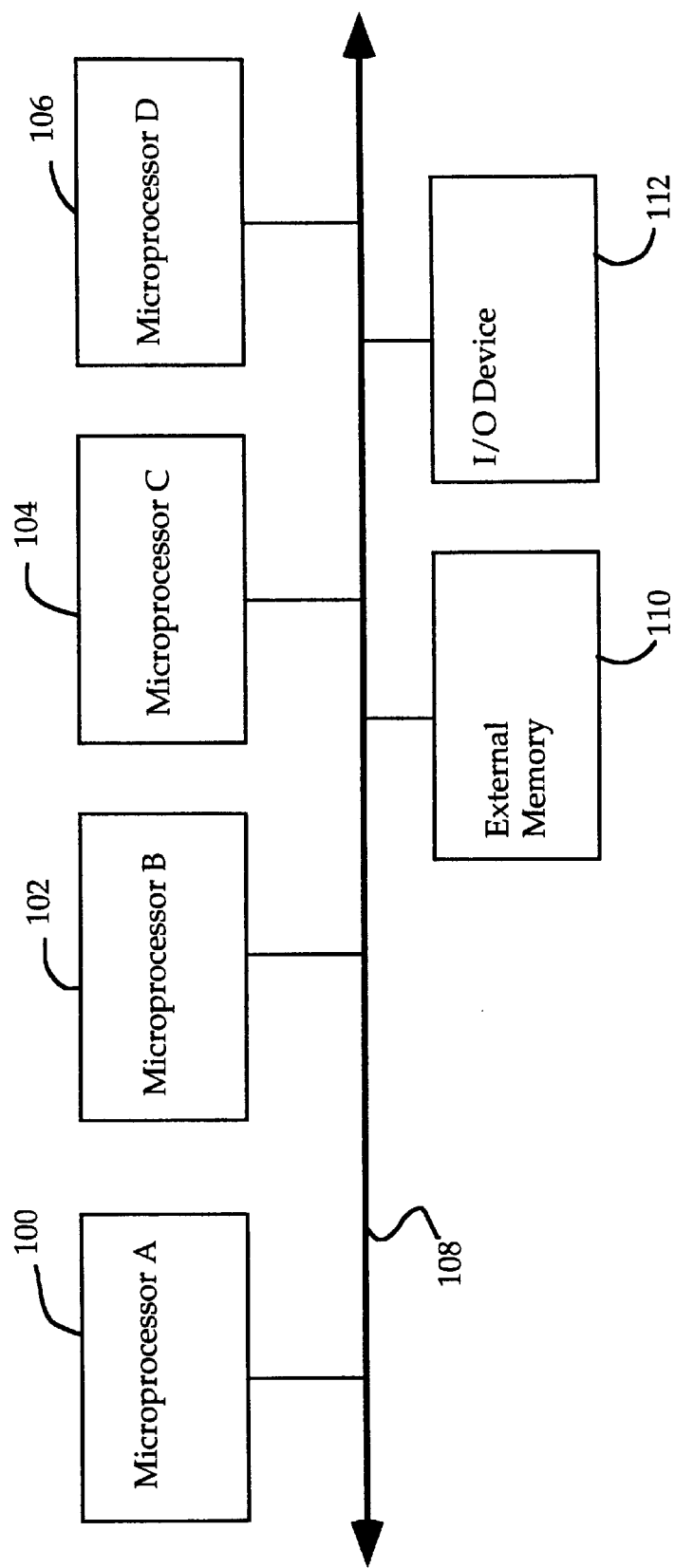
FIG. 3 is a block diagram illustrating a computer system having multiple microprocessors, each configured in accordance with a preferred embodiment of the invention.

FIG. 3 illustrates a multiprocessor computer system having four individual microprocessors 100, 102, 104, and 106 interconnected by a system bus 108. A main memory 110 and an input/output device 112 are also connected to system bus 108. Main memory 110 may include a wide range of memory storage units including ROM's, RAM's and the like. I/O device 112 may include any of a number of input or output devices such as keyboards, CRT displays, and the like. Each of the microprocessors illustrated in FIG. 1 may be identical or they may differ. As will be described more fully below, each microprocessor is capable of speculative execution of instructions. Preferably each microprocessor is also capable of generating instructions out-of-order.

Figure 4:
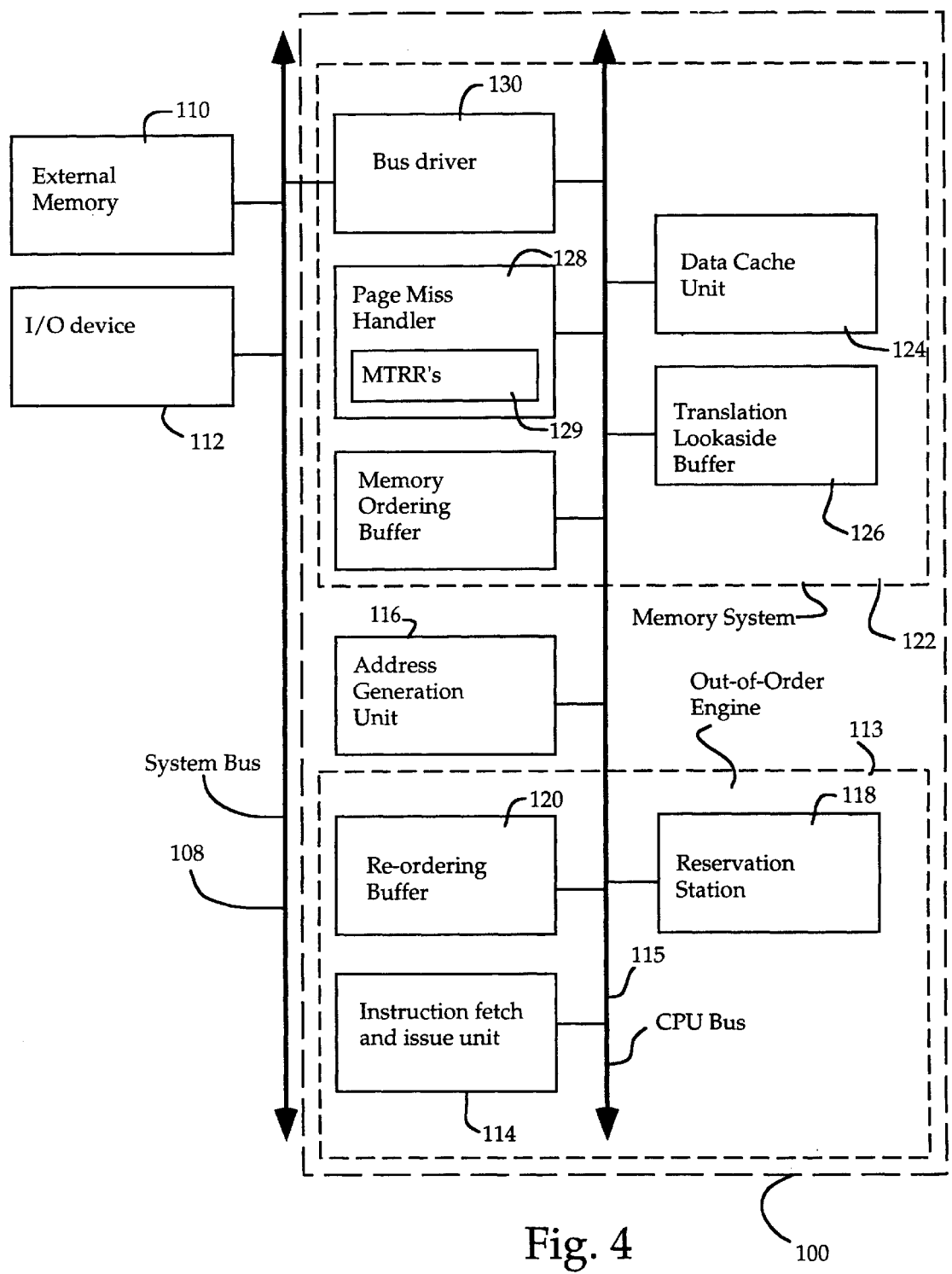
FIG. 4 is a block diagram illustrating selected functional components of one of the microprocessors of FIG. 3, particularly illustrating a TLB operating both in protected mode and in real mode.

FIG. 4 illustrates selected functional components of microprocessor 100 of FIG. 3. An out-of-order engine 113 generates computer instructions, also referred to herein as micro-operations or "uOP's", such as memory loads and stores. The uOP's are, in general, generated in a sequence which may differ from the sequence in which macro-instructions appear within a user's computer program. Further, out-of-order engine 113 is capable of making predictions at branch conditions, such as "If" statements, then speculatively generating instructions subsequent to the branch condition. The instructions are generated speculatively, in part, to allow microprocessor 100 to exploit any parallelism within the computer code to be executed and to exploit pipelining capability of the microprocessor.

Out-of-order engine 113 includes an instruction fetch and issue unit 114 for issue uOP's and a reservation station (RS) 118 for allocating micro-instructions that have not yet been executed, then dispatching the instructions to other functional units according to speculative data dependencies and according to the availability of the other functional units. A general description of a reservation station may be found in the above-cited "Superscalar Microprocessor Design" reference.

Out-of-order engine 113 also includes a re-ordering buffer ("ROB") 120 which stores speculative results from instructions dispatched by RS 118 and executed by the functional units. ROB 120 collects the results from speculative uOP's, reorders the uOP's, then retires the uOP's. In other words, whereas instructions may be executed in an order other than that which appears in a computer program, ROB 120 reorders the uOP's to yield the sequence of instructions specified by the computer program. As with the above-described reservation station, a general description of a re-order buffer may be found in the "Superscalar Microprocessor Design" reference.

The uOP's are dispatched from out-of-order engine 113 in either in a protected mode or in a real mode. In protected mode the linear address for the instruction generated by out-of-order engine 113 is calculated by an AGU 116. In real mode, AGU 116 calculates a physical address for the instruction. The instruction, containing the linear address or physical address, is output from AGU 116 onto CPU bus 115 for routing to a functional unit of the microprocessor for execution of the uOP.

uOP, which involve memory accesses such as memory loads and memory stores are executed by a memory system 122. Memory system 122 includes a DCU 124, a TLB 126, a PMH 128, a memory system bus driver 130, and a memory-ordering buffer (MOB) 132. TLB 126 maintains a cache of address translations between linear addresses and corresponding physical addresses, and as will be described more fully below, TLB 126 also stores a memory-type value which indicates whether the physical address of the memory access specified by the uOP contains speculatable information or non-speculatable information. TLB 126 may be a DTLB, an ITLB or may include both DTLB and ITLB capabilities. The memory-type value, corresponding to particular physical address locations, may be specified by a computer programmer.

In protected mode, a uOP dispatched by RS 118 is latched from CPU bus 115 by TLB 126 which performs a look-up to determine whether its internal cache lines contain the physical address and memory-type corresponding to the linear address of the uOP. If the address translation is found therein, TLB 126 re-dispatches the uOP, updated to include the physical address and memory-type, onto CPU bus 115. In real mode, the uOP dispatched by RS 118 is also latched from CPU bus 115 by TLB 126 which performs a look-up to determine whether its internal cache lines contain the memory-type corresponding to the physical address of the uOP. If the memory-type is found therein, TLB 126 re-dispatches the uOP, updated to include the memory-type, onto CPU bus 115.

Figure 5:
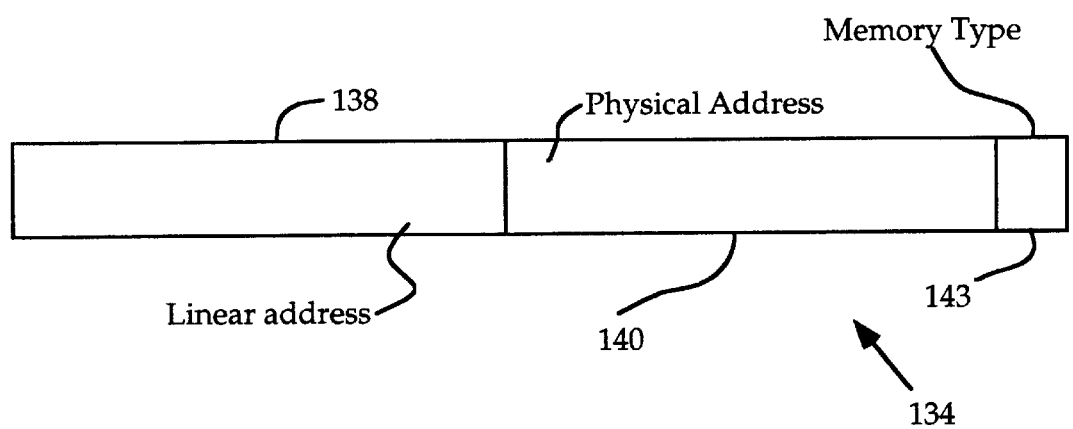
FIG. 5 is a block diagram illustrating an entry of the TLB of FIG. 4 which caches a linear address, a corresponding physical address, and a memory-type value.

An exemplary cache line of TLB 126 is illustrated in FIG. 5. Cache line 134 includes space for a linear address 136, space for a physical address 138, and space for a memory-type value 143. As noted, cache line 134 when the microprocessor is operating in real mode. In protected mode, cache line 134 stores a linear address in addition to the physical address and memory-type value. Cache line 134 may additionally include other information (not shown) for facilitating the caching of physical addresses and linear addresses such as status bits and data parity bits.

Referring again to FIG. 4, DCU 124 includes internal cache lines maintaining data for many of the most recently accessed memory locations. DCU 124 latches the uOP containing the physical address and accesses its internal cache lines to determine if the data for the memory access of the uOP is already contained therein. If the data is contained within DCU 124, the data is retrieved from the internal cache lines and transferred onto CPU bus 115 for further processing by other functional units of microprocessor 100. If the data is not found within DCU 124, system bus driver 130 is accessed to transmit memory requests to external memory 110 to access the data specified by the uoP. DCU 124 may be, for example, a write-back cache or a write-through cache or may be configured to implement a variety of cache protocols. In one embodiment, the memory-type value is also employed for determining the proper cache protocol for processing a uOP.

The operation of DCU 124 and system bus driver 130 may be in accordance with conventional designs, although preferably modified to exploit the speculative capabilities of the microprocessor.

In the event that the translation between the linear address and a physical address is not cached within TLB 126, then PMH 128 performs a page table walk to determine the corresponding physical addresses. If the uOP causing the TLB miss is a non-speculative uOP, PMH 128 performs a non-speculative page table walk by issuing non-speculative page directory entry ("PDE") and page table entry ("PTE") load operations to PDE and PTE tables (not shown). If, however, the uOP causing the DTLB miss is a speculative uOP, then PMH 128 performs a page table walk speculatively. The details of the speculative page table walk are described in co-pending U.S. Patent application Ser. No., 8\176,363, filed Dec. 30, 1993, entitled, "Method and Apparatus for Performing Page Table Walks in a Microprocessor Capable of Processing Speculative Instructions", assigned to the assignee of the present application. As will be described more fully below, PMH 128 also includes a set of memory-type range registers ("MTRR's") 133 which store memory-type values for preferably physical addresses. During a protected mode page table walk, PMH 128 accesses MTRR's 129 during a page table walk to determine the memory-type value for the corresponding linear and physical addresses that missed the TLB. In real mode, PMH 128 merely accesses MTRR's 129 merely to determine the memory-type for the corresponding physical address without performing a page table walk. The memory-type and corresponding physical addresses provided in the MTRR's may be defined at run time by commands within a computer program or may default to predetermined values.

MOB 132 orders memory accesses. More specifically, the MOB maintains lists (not shown) of memory loads and stores and checks the loads and stores for possible adverse memory effects such as may occur if a load to memory mapped I/O is reordered. MOB 132 reorders the memory access operations accordingly and may postpone execution of particular memory access operations until ordering problems are resolved. In particular, the MOB blocks execution of any memory uOP's that are not at retirement and are known to be non-speculatable. As with some of the above-described functional components of microprocessor 100, a general description of a MOB is provided within the "Super-scalar Microprocessor Design" reference cited above.

The foregoing provides a brief overview of the operation of microprocessor 100, particularly the manner by which the TLB operates both in protected mode and in real mode. With reference to the remaining figures, the method and apparatus by which the TLB caches memory-type value along with linear and physical addresses will now be described in greater detail.

Figure 6:
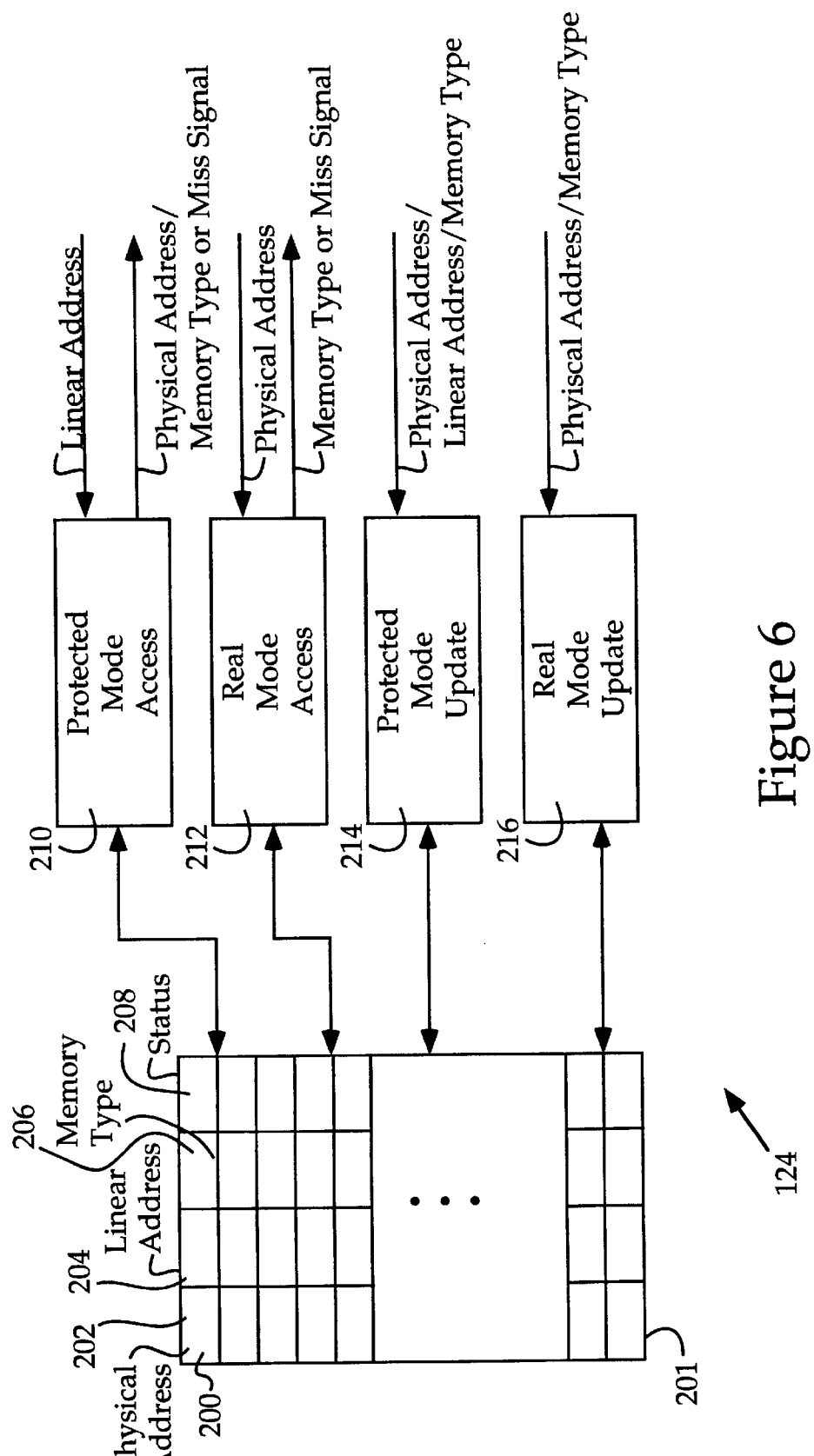
FIG. 6 is a block diagram illustrating the TLB of FIG. 5 which caches a linear address, a corresponding physical address, and a memory-type and which operates both in real mode and in protected mode.

Referring to FIG. 6, the function and operation of TLB 126 will now be described in further detail. TLB 126 includes a set 201 of TLB lines 200, each storing a physical address 202, a linear address 204, a memory-type 206, and a set of status bits 208. Thus, similarly to conventional TLB's, TLB 126 stores a physical address and a corresponding linear address for a set of recently accessed physical addresses. However, unlike conventional TLB's, TLB 126 that stores memory-type 206 which identifies whether the data or instructions stored with the physical address may be accessed immediately or whether the access must be deferred pending some condition such as the resolution of a speculative branch condition. Also, unlike conventional TLB's, TLB 126 operates both in real mode and in protected mode, to allow memory-type values to be retrieved even in circumstances where a translation between physical and linear addresses is not required such as can occur when operating in real mode rather than protected mode. Input and output from TLB 126 is along CPU bus 115 (FIG. 4.) In one embodiment, separate physical address and linear address busses are provided, with the other address bus being used to input data in protected mode and the physical address data being used to input data in real mode.

Various real mode and protected mode accesses are illustrated in FIG. 6 in block diagram form. As can be appreciated by those skilled in the art, the functions illustrated are preferably implemented with appropriate circuitry for high-speed access to the information contained within TLB cache lines 200. More specifically, FIG. 6 illustrates a protected mode access unit 210, a real mode access unit 212, a protected mode update unit 214 and a real mode update unit 216.

Protected mode access unit 210 receives a linear address and accesses TLB lines 200 to determine whether a linear address is stored within the TLB then outputs either a corresponding physical address and memory-type or a TLB miss signal. Protected mode access unit 210 is employed whenever an address translation of a linear address to a physical address is desired. Protected mode update unit 214 operates to add a line to the TLB to update the TLB in the event of a previous TLB miss. Thus, when a TLB miss occurs, the miss signal output by protected mode access unit 210 is received by PMH 128 (FIG. 4) which performs a page table walk in response to the TLB miss and provides the physical address and corresponding to the linear address causing the TLB miss. As illustrated in FIG. 4, PMH 128 also includes MTRR's 129 which provide the memory-type for corresponding physical address locations, allowing the PMH to determine the appropriate memory-type for the corresponding physical address for a page table walk. The method by which PMH 128 retrieves the memory-type from MTRR's 129 is not pertinent to the present invention but is described in detail in a co-pending patent application entitled "Methods and Apparatus for Determining Memory-type by a Processor", Ser. No. 8\171,528, filed Dec. 22, 1993, and assigned to the assignee of rights to the present application, which is incorporated by reference herein.

In protected mode, once the physical address and the memory-type for a corresponding linear address subject to a TLB miss have been determined by PMH 128, the physical address, linear address, and memory-type are stored in one of the TLB lines 200 by operation of protected mode update unit 214.

Protected mode access unit 210 and protected mode update unit 214 may be designed and configured in accordance with conventional TLB techniques with the exception that the memory-type value must also be accessed or updated as appropriate.

Unlike conventional TLB's, TLB 126 includes real mode access unit 212 and real mode update unit 216 which operate to retrieve a memory-type or update a memory-type in real mode, respectively. More specifically, real mode access unit 212 receives a physical address and accesses lines 200 to retrieve a corresponding memory-type value, then either outputs the memory-type or a miss signal, depending upon whether the physical address is found within one of lines 200. Hence, real mode access unit 212 operates in a manner analogous to that of protected mode access unit 210 but receives a physical address rather than a linear address. If a real mode TLB miss signal is generated, PMH 128 (FIG. 4) accesses the MTRR's stored therein to determine the memory-type corresponding to the physical address which generated the miss signal. As noted above, PMH 128 does not perform a page table walk in real mode, since such is not necessary because the physical address is already known. Rather, in real mode, PMH 128 merely accesses the MTRR tables with the physical address to retrieve the corresponding memory-type. Further details regarding the manner by which the PMH operates in real mode to determine the memory-type corresponding to a physical address are set forth in the above-incorporated patent application entitled "Methods and Apparatus for Determining Memory-type by Processor".

Once the real mode TLB miss has been processed to retrieve the memory-type corresponding to the physical address, TLB lines 200 are updated with the physical address and the memory-type using real mode update unit 216. More specifically, real mode update unit 216 adds the physical address and the corresponding memory-type to one of the lines within TLB 126 or replaces a line containing a previously stored address and memory-type. Hence, the operation of real mode update 216 is analogous to that of protected mode update unit 214, but updates the physical address and memory-type rather than the linear address, physical address and memory-type as updated by protected mode update unit 214.

As with protected mode access and update units 210 and 212 described above, real mode access and update units 214 and 216 may be configured in accordance with conventional TLB circuitry modified to accommodate the memory-type value and to operate in real mode rather than protected mode. Numerous different implementations may be provided consistent with the general principles of the invention described herein.

Thus, TLB 126 is accessed both in protected mode and in real mode to determine a memory-type which indicates whether the information stored at the physical address is subject to an immediate memory access or is subject to an access which should be deferred. If the physical address is found within TLB 126, a hit signal is generated and the memory-type, as well as other necessary information, such as the physical address, is output. If the physical address is not found within the TLB, then a miss signal is generated and PMH 128 (FIG. 4) is employed to determine the memory-type based on the physical address and to perform a page table walk if necessary. Ultimately, in either case the memory-type corresponding to the physical address is determined.

The physical address and the corresponding memory-type are transmitted to MOB 132 (FIG. 4) which operates to defer processing of the memory operation accessing the physical address location, if necessary. Thus, if the memory-type indicates that the information stored at the physical address is of a non-speculatable type, then MOB 132 operates to defer any access to the physical address such as a memory load or memory store until all conditions present to the memory access operation are resolved. For example, MOB 132 may defer processing of the memory access operation until speculative branch predictions are resolved. Once all such conditions present are resolved, MOB 132 ispatches the memory operation allowing the operation to access the physical address and load or store date therefrom. For memory-types for which a memory access operation need not be deferred, such as for speculatable memory-types, MOB 132 merely dispatches the memory operation immediately without deferring the operation. ROB 120 ultimately reorders and retires any speculative memory access instructions which were based on correctly predicted branches and squashed or killed instructions that were based on mid-predicted branches.

What has been described is a microprocessor system having a TLB which operates both in real mode and in protected mode to cache a memory-type along with physical or linear addresses to allow the microprocessor to conveniently determine the memory-type for those addresses which are cached within the TLB. Exemplary embodiments of the invention have been described herein. The exemplary embodiments are merely illustrative of the invention and should not be construed as limiting the scope of the invention. Rather, principles of the invention can be implemented in a wide variety of specific configurations and employed with a wide variety of possible applications.

What is claimed is:

1. In a microprocessor for use with a memory, wherein the memory includes memory locations for storing speculatable information and memory locations for storing non-speculatable information, an improvement comprising:
   a translation lookaside buffer (TLB); and
   a storage field within the TLB for identifying whether a memory location contains speculatable or non-speculatable information.

2. The improvement of claim 1, further comprising:
   an access unit coupled to said TLB, said access unit providing access to the TLB in a real mode of operation of the microprocessor to access a value from the storage field.

3. A system comprising:
   a memory to store information of a first or second type at a memory location, said memory location having a corresponding address;
   an instruction generation unit coupled to said memory to provide a memory access instruction specifying the address of said memory location;
   a translation lookaside buffer (TLB) having a plurality of entries to store a plurality of addresses associated with memory locations each along with a value indicating whether information stored at a corresponding memory location is of said first type or said second type;
   a TLB access unit, coupled to said TLB, to access said TLB to determine whether the information identified by the memory access instruction is of said first type or of said second type; and
   a memory access unit, coupled to said TLB access unit and to said memory, to access information within said memory corresponding to the address provided by said instruction generation unit, such that the information is accessed substantially immediately if the information is of said first type and accessed on a deferred basis if the information is of said second type.

4. The system of claim 3,
   wherein said memory is configured for storing information at physical address locations;
   wherein said instruction generation unit includes a unit for generating a memory access instruction specifying a physical address when operating in a real mode and for specifying a linear address when operating in a protected mode; and
   wherein said TLB access unit includes
      a protected mode access unit for accessing said TLB with a linear address to determine a physical address corresponding to said linear address and to determine whether said information corresponding to the physical address is of said first type or said second type; and
      real mode access unit for accessing said TLB with a physical address to determine whether said information corresponding to said physical address is of said first type or said second type.

5. The system of claim 3, wherein said value is a memory-type value indicative of whether memory access is available to said corresponding memory location.

6. The system of claim 3, further including range registers configured to store a said value for a range of memory addresses within said memory.

7. The system of claim 6, wherein said range registers are contained within a page miss handler (PMH) connected to said TLB.

8. The system of claim 7, wherein said PMH provides access to said range registers to determine said value for data corresponding to a TLB miss.

9. The system of claim 8, further including
a TLB update unit, operative in response to said TLB miss, for updating said TLB to include said value from the range registers for a page of memory containing the information having the address not found in said TLB.

10. The system of claim 9, wherein said TLB update unit includes:
real mode TLB update unit for updating said TLB to include the physical address and the value for the page of memory containing the information having the address not found in said TLB.

11. The system of claim 9, wherein said TLB update unit includes:
protected mode TLB update unit for updating said TLB to include the physical address, linear address and value for the page of memory containing the information having the address not found in said TLB.

12. The system of claim 3, wherein said information includes data and said TLB includes a data TLB configured to store physical addresses, linear addresses, and memory-types for selected pages of data.

13. The system of claim 3, wherein said information includes instructions and said TLB includes an instruction TLB configured to store physical addresses, linear addresses, and memory-types for selected instructions.

14. The system of claim 3, further comprising a processor, wherein at least one of said instruction generation unit, TLB, TLB access unit, and memory access unit is contained in said processor.

15. The system of claim 3, further comprising a plurality of processors, wherein at least one of said instruction generation unit, TLB, TLB access unit, and memory access unit is contained in each of said plurality of processors.

16. A method comprising the steps of:
storing a value within a cache associated with a memory to identify whether a memory location subject to a memory access is speculatable or non-speculatable.

17. The method of claim 16, further comprising the step of accessing said cache, which provides address translation, in a real mode to access said value.

18. In a computer system having a memory configured to store information of a first or second type at a physical address, a translation lookaside buffer (TLB) for caching physical addresses, corresponding linear addresses and a value indicating whether information at said physical address is of said first type or said second type, an instruction issue unit for generating memory access commands, said memory access commands being generated in a real mode wherein no address translation of an address of the memory location of the memory access is required or a protected mode wherein address translation is required, a method for comprising the steps of:
determining whether said system is operating in real mode or in protected mode;
dispatching a memory access instruction specifying an address of information to be accessed within said memory, said address being a physical address if said system is operating in real mode and a linear address if said system is operating in protected mode;
if in real mode, accessing said TLB to determine if said TLB contains said physical address and a corresponding one of said values indicating whether information at said physical address corresponding to said instruction is of said first type or said second type;
if in protected mode, accessing said TLB to determine if said TLB contains said linear address, a corresponding physical address and a corresponding one of said values indicating whether information at said physical address corresponding to said instruction is of said first type or said second type; and
accessing information within said memory corresponding to said address of said instruction, with said access being performed immediately for information of said first type and deferred for information of said second type.

19. In a computer system capable of operating in a first mode or a second mode and having a memory and a translation lookaside buffer (TLB), a method comprising the steps of:
storing information of a first or second type in the memory, said information being stored at a physical address within the memory;
determining whether said computer system is operating in the first mode or in the second mode;
if operating in the first mode, storing, within the TLB, a physical address and a value indicating whether said information stored within said memory at said physical address is of said first type or said second type for predetermined pages of memory;
if operating in the second mode, storing, within the TLB, a linear address, a corresponding physical address and a value indicating whether said information stored within said memory at said corresponding physical address is of said first type or said second type for selected pages of memory;
generating a memory access instruction specifying an address of information to be accessed within said memory, said instruction specifying a physical address if said system is operating in the first mode and specifying a linear address if said system is operating in the second mode;
accessing said TLB to determine whether information subject to said memory access instruction is of said first type or of said second type; and
accessing information within said memory corresponding to said address of said instruction, with said access being performed substantially immediately for information of said first type and with said access being deferred for information of said second type.

20. The method of claim 19, including the step of storing values within range registers indicating whether information is of said first or second type for all information stored in said memory.

21. The method of claim 20, wherein said range registers are stored within a page miss handler connected to said TLB.

22. The method of claim 20, further including the step of accessing said range registers to determine the value if said address of said instruction is not provided by said TLB.

23. The method of claim 22, further including the step of updating said TLB to include the value from the range register for a page of memory containing the information having the address not found in said TLB.

24. The method of claim 23, wherein said step of updating said TLB includes the step of
if operating in the first mode, updating said TLB to include the physical address and the value for the page of memory containing the information having the address not found in said TLB.

25. The method of claim 23, wherein said step of updating said TLB includes the step of updating said TLB to include the physical address, linear address and value for the page of memory containing the information having the address not found in said TLB.

26. The method of claim 19, wherein said information includes data and said TLB is a data TLB configured to store physical addresses, linear addresses, and memory-types for selected pages of data.

27. The method of claim 19, wherein said information includes instructions and said TLB is an instruction TLB configured to store physical addresses, linear addresses, and memory-types for selected instructions.

28. A translation lookaside buffer having a plurality of entries each comprising:

a first field configured to store a physical address;

a second field, coupled to the first field and configured to store a linear address; and a third field, coupled to the second field, and configured to store a value indicating whether a memory address is speculatable or non-speculatable.

29. A microprossesor for use with a memory, the microprossesor comprising:

means for determining whether an access to the memory is to s first or a second type of memory; and means, coupled to the means for determining, for speculatively executing the access if to the second type.

30. An apparatus comprising:

a memory configured to store data and instructions at locations in the memory;

a processing unit, coupled to the memory, for executing the instructions to access the data at the locations in the memory;

at least one first register, coupled to the processing unit, configured to store an address of one of the locations; and at least one second register, coupled to the first register, configured to store a value indicating whether instructions specifying access to the address may be performed speculatively by the processing unit.

31. A method of accessing a memory by a microprocessor which executes a first instruction specifying a logical address in the memory the method comprising the steps of:

generating a physical address in response to the logical address;

storing the logical address and the physical address in a translation lookaside buffer;

determining and storing in the translation lookaside buffer an indication of whether instructions accessing the logical address may be performed speculatively;

comparing an address specified by a second instruction to the stored indication; and executing the second instruction speculatively or non-speculatively, according to the stored indication.

* * * * *

UNITED STATES PATENT AND TRADEMARK OFFICE
CERTIFICATE OF CORRECTION

PATENT NO.    : 5,956,753
DATED         : September 21, 1999
INVENTOR(S)   : Glew et al.

It is certified that error appears in the above-identified patent and that said Letters Patent is hereby corrected as shown below:

Column 7,
Lines 48, 50 and 56, after "TLB's," insert -- the --.
Line 61, after "from" insert -- the --.

Column 8,
Line 43, after "TLB's," insert -- the --.

Column 9,
Lines 7 and 27, after "within" insert -- the --.
Line 22, after "Thus," insert -- the --.
Line 47, delete "ispatches" and insert -- dispatches --.

Column 13,
Line 25, delete "s" and insert -- a --.

Signed and Sealed this

Twenty-fifth Day of March, 2003

JAMES E. ROGAN
*Director of the United States Patent and Trademark Office*